United States Patent
Kanazawa et al.

[11] Patent Number: 6,104,118
[45] Date of Patent: Aug. 15, 2000

[54] ALTERNATING CURRENT GENERATOR FOR USE IN VEHICLE

[75] Inventors: Hiroshi Kanazawa, Hitachioota; Kazuo Tahara, Hitachi; Yoshiaki Honda; Masami Takano, both of Hitachinaka; Masahiro Mita, Fukaya, all of Japan

[73] Assignee: Hitachi, Ltd., Tokyo, Japan

[21] Appl. No.: 09/262,864

[22] Filed: Mar. 5, 1999

[30] Foreign Application Priority Data

| Mar. 5, 1998 | [JP] | Japan | 10-053326 |
| Mar. 6, 1998 | [JP] | Japan | 10-054710 |

[51] Int. Cl.⁷ .......................... H02K 1/22; H02K 21/04
[52] U.S. Cl. .......................... 310/263; 310/181
[58] Field of Search ...................... 310/263, 181, 310/218

[56] References Cited

U.S. PATENT DOCUMENTS

| 4,959,577 | 9/1990 | Radomski | 310/263 |
| 5,306,977 | 4/1994 | Hayashi | 310/263 |
| 5,578,885 | 11/1996 | Alford et al. | 310/263 |
| 5,747,913 | 5/1998 | Amlee et al. | 310/263 |
| 5,793,144 | 8/1998 | Kusase et al. | 310/263 |
| 5,828,155 | 10/1998 | Adachi | 310/263 |
| 5,907,209 | 5/1999 | Ishida | 310/263 |

FOREIGN PATENT DOCUMENTS

| 3-265450 | 11/1991 | Japan . |
| 4-251553 | 9/1992 | Japan . |
| 7-15929 | 1/1995 | Japan . |
| 7-131946 | 5/1995 | Japan . |
| 7-312854 | 11/1995 | Japan . |
| 9-098556 | 4/1997 | Japan . |

*Primary Examiner*—Clayton LaBalle
*Attorney, Agent, or Firm*—Evenson, McKeown, Edwards & Lenahan, P.L.L.C.

[57] ABSTRACT

A rotor 2 comprises of a pair of claw shape magnetic poles 3N and 3S and plural permanent magnets 5. The permanent magnet 5 is arranged between claw portions of the claw shape magnetic poles 3N and 3S. A permanent magnet fly-out prevention member 61 is arranged at an outer periphery of the claw shape magnetic poles 3N and 3S and prevents the fly-out of the permanent magnet 5 when the rotor 2 rotates. A permanent magnet holding member 62 holds the permanent magnet 5 from an inner periphery side. In a construction in which the permanent magnet fly-out prevention member 61 is arranged between the claw portions of the claw shape magnetic poles 3N and 3S, the working operation for arranging the permanent magnet 5 between the claw portions of the claw shape magnetic poles 3N and 3S can be improved, thereby a vehicle use AC generator having an improved electric power generation efficiency can be provided.

13 Claims, 7 Drawing Sheets

ALTERNATING CURRENT GENERATOR FOR USE IN VEHICLE

BACKGROUND OF THE INVENTION

The present invention relates to an alternating current (AC) generator for use in a vehicle and in particularly to an alternating current (AC) generator for use in a vehicle suited for as an electric power generation apparatus for used in an automobile.

In general, an AC generator for use in a vehicle is constituted by a rotor and a stator. The rotor is constituted a pair of oppositely arranged claw shape magnetic poles in which plural claw portions are formed at tip end portions thereof and a field winding for magnetizing the claw shape magnetic pole. Further, the stator is arranged by setting apart at a predetermined interval and further generates an alternating current (AC) voltage according to a magnetization of the claw shape magnetic pole of the rotor.

With the vehicle use AC generator stated in above, since the rotor rotates and a direct current (DC) flows in the field winding, N pole and S pole are generated in the pair of the claw shape magnetic poles. A magnetic flux flown from the claw portion of the claw shape magnetic pole of N pole forms a magnetic circuit in which the magnetic flux passes through a stator iron core of the stator and returns to the claw portion of the claw shape magnetic pole of S pole. In this time, since the magnetic flux of the magnetic circuit intersects the stator winding of the stator, an alternating current (AC) induction voltage generates to the stator winding.

In the vehicle use AC generator stated in above, a magnetic flux amount which intersects the stator winding gives an influence on the electric power generation current. Therefore, in the conventional vehicle use AC generator, a permanent magnet is arranged between the claw portions of the claw shape magnetic pole and the magnetic flux which is formed by the field winding is increased, accordingly the magnetic flux amount which intersects the stator winding is increased.

Further, in the conventional vehicle use AC generator, for example as described in Japanese application patent laid-open publication Nos. Hei 4-251553 and Hei 7-312854, not to fly out the permanent magnet which is arranged between the claw portions of the claw shape magnetic pole according to a centrifugal force caused by the rotation of the rotor, a fly-out prevention member (a non-magnetic material body protection cover) is arranged at the most outer peripheral portion of the claw shape magnetic pole.

However, in the conventional vehicle use AC generator apparatus described in Japanese application patent laid-open publication No. Hei 4-251553, using the non-magnetic material body protection cover, the fly-out of the permanent magnet can be prevented, however since it is necessary to arrange directly plural permanent magnets between the claw shape magnetic poles, respectively, a working operation lowers.

Against to the above stated conventional vehicle use AC generator structure, another type vehicle use AC generator structure is shown, for example described in Japanese application patent laid-open publication No. Hei 3-265450, namely in the AC generator a permanent magnet is arranged between the claw portions of the claw shape magnetic pole and further a protection cover of a non-magnetic material body is arranged only an outer peripheral face of the permanent magnet. This protection cover uses both as the fly-out prevention of the permanent magnet and the holding of the permanent magnet.

However, in the vehicle use AC generator shown in Japanese application patent laid-open publication No. Hei 3-265450, the fly-out prevention member of the permanent magnet uses also the holding of the permanent magnet, since it is necessary to arrange the fly-out prevention member in the outer peripheral portion of the permanent magnet and also in an inner periphery side of the claw shape magnetic pole, a size of the permanent magnet is restricted and becomes small. As a result, since the increase magnetic field operation of the magnetic flux by the provision of the permanent magnet becomes small, there is a problem in which an improvement of an electric power generation efficiency is not hoped so much.

Further, Japanese application patent laid-open publication No. Hei 7-15929 discloses in which, in a claw shape magnetic pole itself of an alternative current (AC) generator for used in a brushless motor, using an austenitic system stainless steel, a portion between the claw shape magnetic poles is non-magnetic material body processed according to a thermal processing.

However, in the above stated Japanese application patent laid-open publication No. Hei 7-15929, the claw shape magnetic pole itself is formed using the austenitic system stainless steel, to make small the leakage magnetic flux since a thickness of the austenitic system stainless steel is necessary to have 5 mm degree, since a large output of a laser to be used is required, an equipment becomes large. Further, when a thin plate is used, there is a problem in which the leakage magnetic flux between the claw shape magnetic poles increases. Further, as the vehicle use AC generator, when it is left as it is at a cold district there is an afraid that a non-magnetic portion returns to the magnetic pole body.

SUMMARY OF THE INVENTION

An object of the present invention is to provide an alternating current (AC) generator for use in a vehicle wherein even in a structure where a fly-out prevention member which is arranged between the claw portions of the claw shape magnetic pole is provided, a working operation for arranging the permanent magnet between the claw portions of the claw shape magnetic pole can be improved and further an electric power generation efficiency can be improved.

A further object of the present invention is to provide a vehicle use AC generator wherein a permanent magnet arranged between the claw portions of the claw shape magnetic pole is formed in advance as an integral magnet module according to a permanent magnet holding member and between the claw portions of the claw shape magnetic pole the magnet module is assembled integrally, accordingly the electric power generation current is increased and the electric power generation efficiency can be improved.

To attain the above stated objects, according to the present invention, in an alternating current generator for use in a vehicle comprising an oppositely arranged pair of claw shape magnetic poles, each having plural claw portions, plural permanent magnets arranged between said claw portions of said oppositely arranged claw shape magnetic poles, a rotor having a permanent magnet fly-out prevention member for preventing fly-out of said permanent magnet, and a stator arranged by setting apart with a predetermined interval to said rotor, the vehicle use alternating current generator further comprises a permanent magnet holding member for holding said plural permanent magnets from an inner periphery side, and said permanent magnet fly-out prevention member is arranged at outer periphery sides of said claw portion of said claw shape magnetic pole and said permanent magnet.

With the above stated vehicle use AC generator construction according to the present invention, since the permanent magnet is held by the permanent magnet holding member, the working operation during the assembly of the rotor can be improved, since the permanent magnet is arranged between the claw portions of the claw shape magnetic pole by holding the permanent magnet holding member from the inner peripheral portion, the size of the permanent magnet can be formed large, as a result the electric power generation efficiency can be improved.

Further, preferably, the above stated permanent magnet fly-out prevention member is constituted by the non-magnetic material body member.

Further, preferably, the thickness of the permanent magnet fly-out prevention member is less than ½ of the gap length between the rotor and the stator. With this construction, the increase in the magnetic gap length can be prevented.

Further, preferably, the above stated permanent magnet fly-out prevention member is constituted by the magnetic material body and also has the hole portion at the position of the outer periphery side of the above stated permanent magnet.

With the above stated vehicle use AC generator construction, since the permanent magnet fly-out prevention member is constituted by the magnetic material body, the magnetic gap length is equal to the mechanical gap length and the increase in the magnetic resistance can be prevented. Also the width of the fly-out prevention member of the magnetic material body is narrow in the outer periphery side of the permanent magnet and the magnetic saturation is invited easily, and since the leakage magnetic flux can be reduced, the magnetic flux amount which intersects the stator winding can be increased, as a result the electric power generation efficiency can be improved.

Further, preferably, the above stated permanent magnet fly-out prevention member is arranged at the low step stage of the step stage difference portion which is formed in the claw portion of the claw shape magnetic pole and also the thickness of the permanent magnet fly-out prevention member is equal to the step stage difference of the above stated step stage portion.

With the above stated vehicle use AC generator construction, since the surface of the permanent magnet fly-out prevention member has the same face of the surface of the claw shape magnetic pole, the mechanical strength of the rotor can be heightened, as a result the wind loss of the rotor can be reduced.

To attain the above stated objects, according to the present invention, in an alternating current generator for use in a vehicle comprising a pair of oppositely arranged claw shape magnetic poles in which plural claw portions are formed at a tip end portion, field winding for magnetizing said claw shape magnetic pole, permanent magnets arranged between said claw portions of said claw shape magnetic poles and for magnetically increasing the magnetic flux which is formed by said field winding and further integrally formed as one body by a permanent magnet holding member, a stator arranged by setting apart a predetermined interval to a rotor and having a stator winding which generates the alternating current voltage by the magnetism of said claw shape magnetic pole, and a metal form fly-out prevention member for preventing a scattering of said permanent magnet arranged at the most outer peripheral portion of said claw shape magnetic pole, the vehicle use alternating current generator, in said metal form fly-out prevention member, a magnetic material body portion and a non-magnetic material body portion are mixed with.

As the material of the fly-out prevention member, an assembly member in which the magnetic material body and the non-magnetic material body are assembled using the welding manner, and since the magnetic material body is arranged at the surface of the claw shape magnetic pole and further the non-magnetic material body is arranged at the portion corresponding to the between the claw shape magnetic poles, the leakage magnetic flux can be reduced and without the increase in the magnetic gap length, as a result the performance improvement can be realized.

Further, to the fly-out prevention member the composite metal cover having the property of the magnetic material body and the non-magnetic material body is used, and further the magnetic material body is arranged at the surface of the claw shape magnetic pole and further the non-magnetic material body is arranged at the portion corresponding to the between the claw shape magnetic poles, the leakage magnetic flux can be reduced and the increase in the magnetic gap length can be retrained, as a result the good performance can be obtained. In the above stated vehicle use AC generator, preferably, the above stated fly-out prevention member is a cylindrical shape continuous member. With this construction, the working for installing the fly-out prevention member to the outer face side of the permanent magnet and the outer peripheral face of the claw portion of the claw shape magnetic pole can be carried out easily.

Further, preferably, at the end portion of the outer periphery side of the claw portion of the claw shape magnetic pole in the axial direction, at least one step stage having the high step stage portion and the low step stage portion is formed, and further at the low step stage portion of the claw portion, the outer face of the above stated fly-out prevention member is arranged to have the substantially same face of the peripheral face of the high step stage portion of the above stated claw portion. With this construction, the fly-out prevention member and the claw portion of the claw shape magnetic pole can be fixed strongly and the mechanical strength of the rotor can be heightened, as a result the wind loss of the rotor can be reduced.

Further, preferably, the above stated fly-out prevention member is fixed to the claw portion of the above stated claw shape magnetic pole according to the welding manner or the vanish manner after the shrinkage fitting or the press fitting etc.

Further, according to the present invention, in an alternating current AC generator comprising a rotor having a pair of opposite arranged claw shape magnetic poles in which plural claw portions are formed at a tip end portion thereof, field winding for magnetizing said claw shape magnetic pole, a permanent magnet assembled in between said claw portions of said claw shape magnetic pole and increasing the magnetic flux which is formed by said field winding, a magnet module formed integrally said permanent magnet with a thin plate making in a cylindrical shape, and a fly-out prevention member arranged at an outer face side of said permanent magnet and for preventing the fly-out of said permanent magnet, and a rotor arranged by setting apart in a predetermined interval with said rotor and for generating the alternating current voltage, said permanent magnet is a solid magnet and said magnet module is integrally formed by combing said solid magnet and said fly-out prevention member arranged at an outer face side of said solid magnet according to a vanish member or a resin etc.

With the construction stated in above, since the permanent magnet formed integrally as the magnet module is the solid magnet, in comparison with the conventional magnet which is made by solidifying the magnetic powders using the resin, the magnetism force and the energy product can be made large, and the magnetic flux for directing from the claw portion of the claw shape magnetic pole can be increased, as a result the electric power generation current can be improved. Further, by combining the permanent magnet holding member in which the permanent magnet is arranged with the fly-out prevention member which is arranged at the outer face side of the claw shape magnetic pole, since they are formed integrally, even when the rotor rotates and the centrifugal force works on, the durable structure can be obtained. Further, using the permanent magnet holding member, during the installation of the rotor, it is unnecessary to install the plural permanent magnets between the claw portions of the claw shape magnetic pole, as a result an assembly efficiency of the rotor can be improved.

Further, preferably, the above stated permanent magnet holding member can hold the permanent magnets by utilizing the claw portion prepared by punching out the thin plate using a press machine. Further, the magnet module comprised of the permanent magnet holding member and the permanent magnets is fixed to the claw portion of the above stated claw shape magnetic pole using the vanish member.

DESCRIPTION OF THE INVENTION

Hereinafter, a construction of an alternating current (AC) generator for use in a vehicle of a first embodiment according to the present invention will be explained referring to from FIG. 1 to FIG. 8.

First of all, referring to FIG. 1, a whole construction of an AC generator for use in a vehicle of the first embodiment according to the present invention will be explained.

Figure 1:
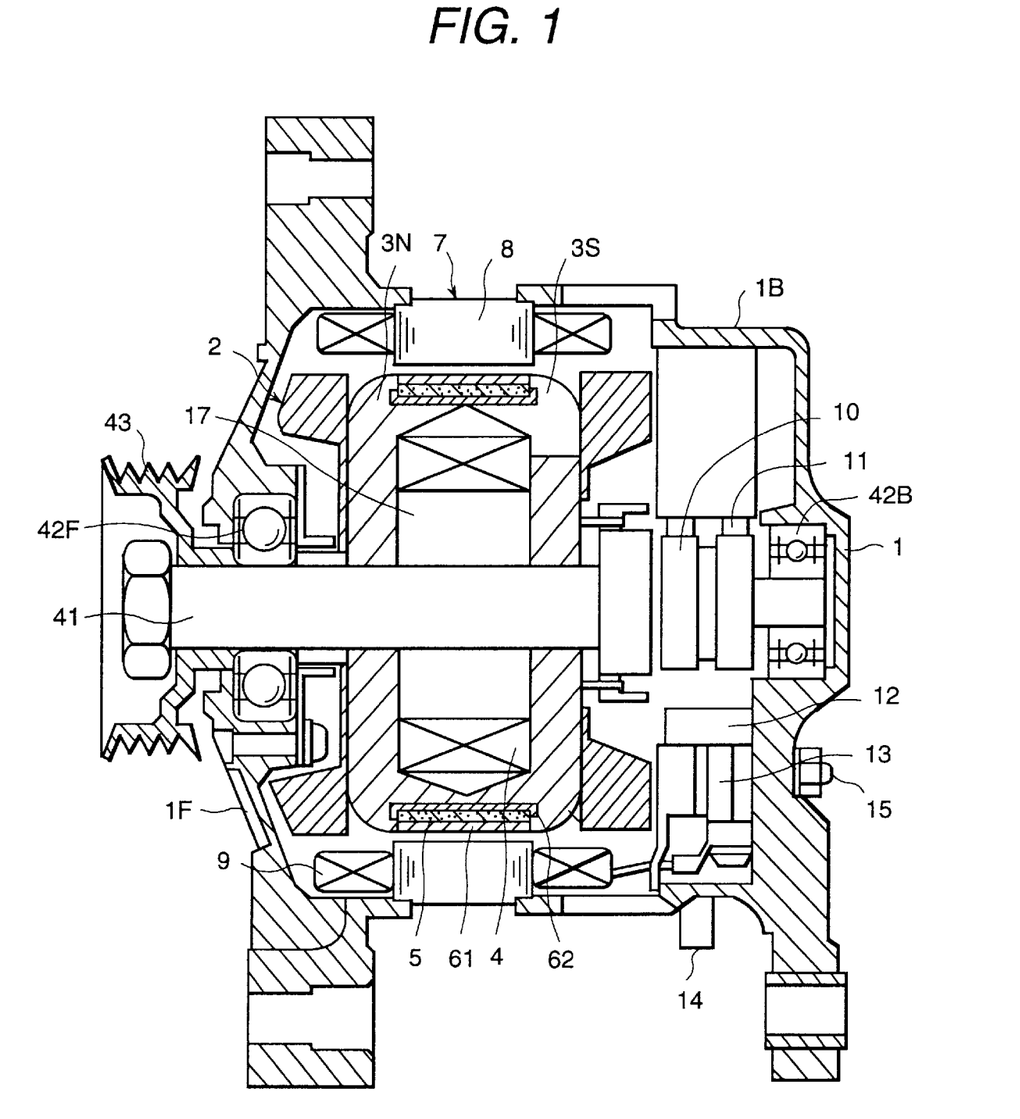
FIG. 1 is a cross-sectional view showing a whole construction of an AC generator for use in a vehicle of a first embodiment according to the present invention.

FIG. 1 is a cross-sectional view showing a whole construction of AC generator for use in the vehicle of one embodiment according to the present invention.

The vehicle use AC generator of the first embodiment according to the present invention has a bracket 1, and the bracket 1 is constituted by a pulley side end bracket 1F and an anti pulley side end bracket 1B. At a central portion of the bracket 1, a shaft 41 is supported through bearing members 42F and 42B. To an end portion of one side of the shaft 41, a pulley 43 is installed and to an end portion of another side of the shaft 41 a slip ring 10 is installed. The pulley 43 is connected to an output shaft of an internal combustion engine through a belt not shown in figure and rotates in proportion to a rotation number of the engine. To the slip ring 10, a brush member 11 is installed sliding and supplies the electric power to a field winding 4 stated in a latter portion from the brush member 11.

Further, to a central portion of the shaft 41 a rotor 2 is installed. The rotor 2 is constituted by a yoke 17 which is fixed to the shaft 41, the field winding 4 wound around at an outer periphery of the yoke 17, a pair of claw shape magnetic poles 3N and 3S which are provided by sandwitching the yoke 17 and the field winding 4, and a permanent magnet 5 which is arranged between the claw portions of the claw shape magnetic poles 3N and 3S. A direct current (DC) from the slip ring 10 is flown to the field winding 4 and then the claw shape magnetic poles 3N and 3S are magnetized.

Figure 2:
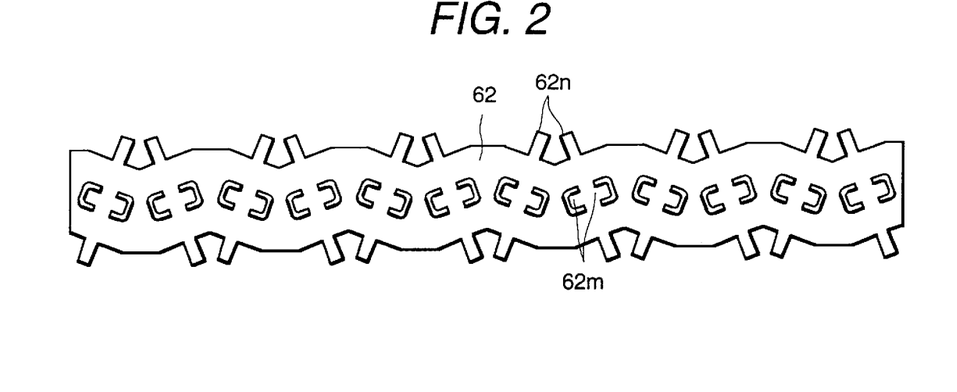
FIG. 2 is a plan view showing a construction of a permanent magnet holding member used in an AC generator for use in a vehicle of the first embodiment according to the present invention.

Herein, the permanent magnet 5, stated in latter portion referring to FIG. 2 and after, is fixed by a permanent magnet holding member 62. Further, at the claw shape magnetic poles 3N and 3S and a surface of the permanent magnet 5, a fly-out prevention member 61 for preventing a fly-out of the permanent magnet 5 is arranged. Further, as the permanent magnet 5 a solid body magnet is used. By an employment of the solid body magnet as the permanent magnet, comparing with a permanent magnet which is hardened using magnetic powers, a magnetization force and an energy area of the claw shape magnetic pole become large, the magnetic field for directing to the stator from the claw portion of the claw shape magnetic pole can be increased and the electric power generation current becomes large, accordingly the electric power generation efficiency can be improved.

The stator 7 is installed between the pulley side end bracket 1F and the anti pulley side end bracket 1B. The stator 7 is arranged by setting apart a slight interval (a mechanical gap) with the rotor 2. This mechanical gap is a predetermined interval which is necessary to be from a relationship of a mechanical characteristic and is in commonly about 0.4 mm degree. The stator 7 has an uneven shape stator iron core 8 and a recessed portion of the stator iron core 8 the stator winding 9 is wounded with three phases, and when the claw shape magnetic poles 3N and 3S rotate according to the drive of the engine and are magnetized, an induction voltages of the three phases generates in the stator winding 9.

In an interior portion of the anti pulley side end bracket 1B, a rectifying circuit 12 and a voltage adjusting means 13 are arranged. The rectifying circuit 12 has B terminal 14 which is connected to a plus electrode of a battery not shown in figure and an earth terminal 15 which is connected to a minus terminal of the battery and rectifies an alternating current (AC) induction voltage which is generated in the stator winding 9 and further converts to a direct current (DC) voltage. The voltage adjusting means 13 controls the field winding current to hold DC voltage, which is rectified by the rectifying circuit 12 to charge the battery, at a constant voltage of about 14.3 V degree.

With the vehicle use AC generator constituted in above according to the present invention, when the pulley 43 is rotated by the drive of the engine, the shaft 41 rotates together with the slip ring 10 and the rotor 2, and DC current from the brush member 11 is electrically supplied to the field winding 4 of the interior portion of the rotor 2 and further the field winding 4 operates to constitute N pole and S pole in the respective magnetic poles of the claw shape magnetic poles 3N and 3S. The field flux according to the filed winding 4 forms the magnetic circuit in which the field flux starts from the claw portion of the claw magnetic pole 3N of N pole and passes through the stator iron core 8 and returns to the claw portion of the claw magnetic pole 3S of S pole.

In this time, the magnetic flux of the permanent magnet 5 for an auxiliary exciting use is arranged in parallel against the magnetic flux which is made by the field winding 4 and enters from N pole to S pole and operate to increase the magnetic flux which is formed by the field winding 4, as a result the magnetic flux amount in the magnetic circuit is increased. Since the magnetic flux of the magnetic circuit intersects to the stator winding 9, the induction voltage of the three phases generates in the stator winding 9. This three phases induction voltage is converted to DC current in the rectifying circuit 12, and the rectified voltage is adjusted by the voltage adjusting means 13, and then it is held about 14.3 V degree.

Next, referring to FIG. 2, a construction of the permanent magnet holding member used in the vehicle AG generator of this first embodiment according to the present invention will be explained and further referring to from FIG. 3 to FIG. 5 a holding condition of the permanent magnet using the permanent magnet holding member of this first embodiment according to the present invention will be explained.

Figure 3:
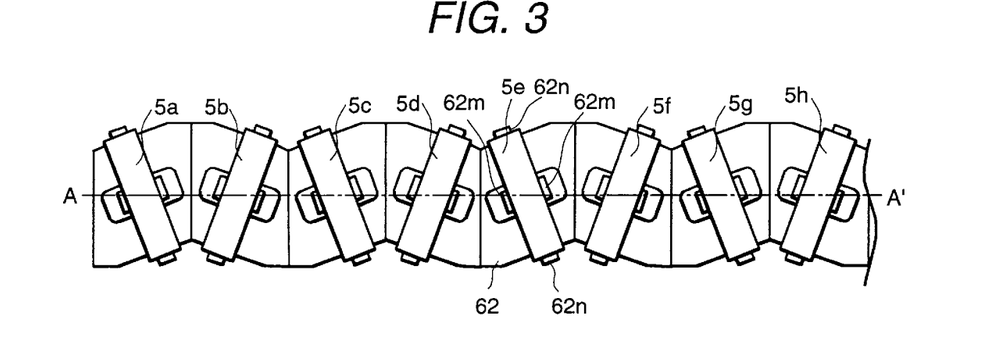
FIG. 3 is a plan view for explaining a holding condition of the permanent magnet using the permanent magnet holding member of the first embodiment according to the present invention.
Figure 4:
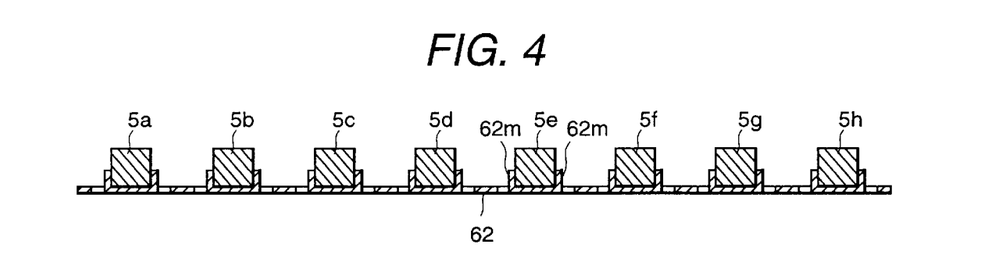
FIG. 4 is a cross-sectional view taken along to a line A-A' of FIG. 3.
Figure 5:
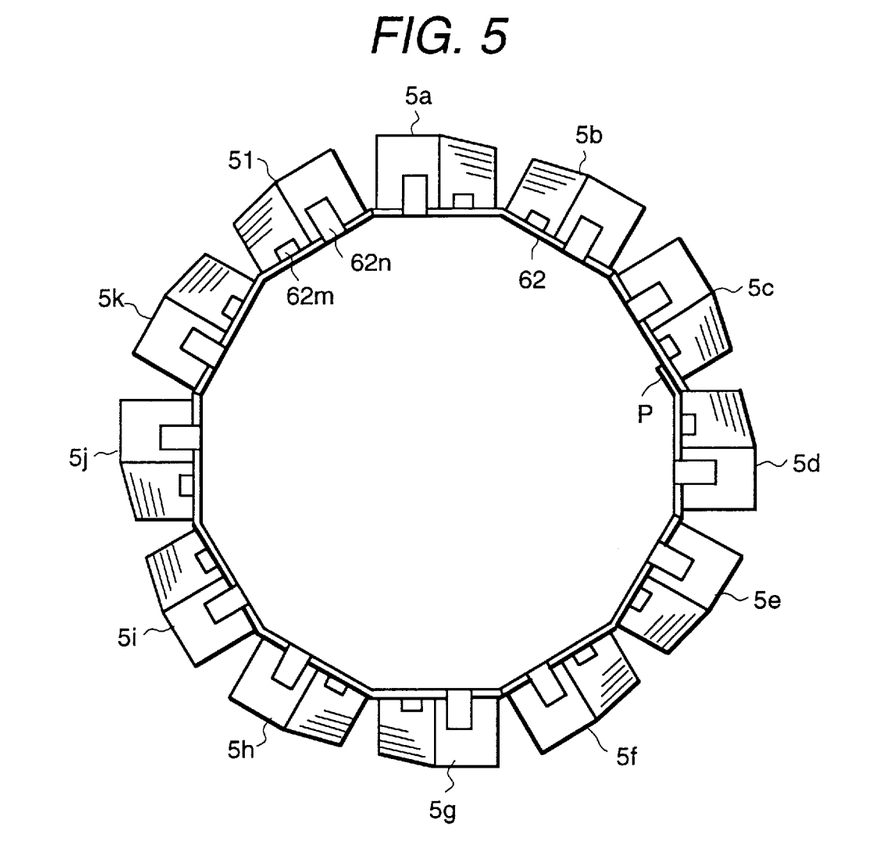
FIG. 5 is a side view showing a construction of a permanent magnet holding member used in an AC generator for use in a vehicle of the first embodiment according to the present invention.

FIG. 2 is a plan view showing a construction of a permanent magnet holding member used in the AC generator for use in a vehicle of the first embodiment according to the present invention, FIG. 3 is a plan view for explaining a holding condition of the permanent magnet using the permanent magnet holding member of the first embodiment according to the present invention, FIG. 4 is a cross-sectional view taken along to a line A-A' of FIG. 3, and FIG. 5 is a side view showing a construction of a permanent magnet holding member used in the AC generator for use in a vehicle of the first embodiment according to the present invention.

First of all, as shown in FIG. 2, the permanent magnet holding member 62 used in this first embodiment according to the present invention, a thin plate made of a non-magnetic material body is carried out under a press fitting processing manner and is manufactured to have a shape shown in figure. The permanent magnet holding member 62 has a claw portion 62*m* which is formed at an inner side in a longitudinal direction and a claw portion 62*n* which is formed at an outer side in a width direction. In the vehicle use AC generator of this first embodiment according to the present invention, since the permanent magnet holding member 62 holds twelve (12) permanent magnets, the permanent magnet holding member 62 has twenty four (24) claw portions 62*m* and twenty four (24) claw portions 62*n*.

The non-magnetic material body thin plate has a thickness of 0.1 mm–1.0 mm degree and as a material a stainless steel plate, a non-magnetic spring steel and a phosphorus bronze, etc. are used. Herein, the reason why the spring steel is used is that by an elastic characteristic being haven the metal at the claw portion since the holding of the permanent magnet is done easily, there is a merit about a superior working operation.

Next, FIG. 3 and FIG. 4 show a condition in which the permanent magnets 5*a*, 5*b*, 5*c*, . . . , and 5*h* are held by the permanent magnet holding member 62. For example, the permanent magnet 5*e* is mounted on the permanent magnet holding member 62 and further by folding the two claw portions 62*m* and the two claw portions 62*n* the permanent magnet 5*e* is sandwiched and held. The permanent magnet 5 has a rectangular shape, the claw portion 62*m* holds in the width direction of the permanent magnet 5 and on the other hand the claw portion 62*n* holds in the longitudinal direction of the permanent magnet 5, respectively.

Next, as shown in FIG. 5, the permanent magnet holding member 62 which holds the permanent magnets 5*a*, 5*b*, 5*c*, . . . , and 51 is bent in a cylindrical shape. P point shown in figure is a connection point and is fixed using a welding method. The detail explanation will be omitted, however when a magnetic pole number of the rotor claw shape magnetic pole is twelve (12) poles, the permanent magnet holding member 62 for holding the permanent magnets 5*a*, 5*b*, 5*c*, . . . , and 51 is a column shape having a dodecagon shape. Further, as to an assembly of the permanent magnet holding member 62 with the rotor 2, at a condition shown in FIG. 5, a protruded portion of the permanent magnet 5 which is arranged in the permanent magnet holding member 62 between the claw shape magnetic poles is assembled to be coincided.

Herein, an assembly process of the rotor 2 will be explained referring to FIG. 1.

Firstly, to the shaft 41 the claw shape magnetic pole 3N is installed. Further, an assembly body in which the yoke 17 and the field winding 4 are installed as one body is assembled to the shaft 41. Further, the permanent magnet holding member 62 for holding the permanent magnet 5 which is processed in the column shape as shown in FIG. 5 is installed to the shaft 41. In this time, the permanent magnet 5 is installed to be arranged between the claw portions of the claw shape magnetic pole 3N. Further, the claw shape magnetic pole 3S is installed to the shaft 41. In this time, the permanent magnet 5 is installed to be arranged between the claw portions of the claw shape magnetic pole 3S.

As stated in above, plural permanent magnets 5 are held by the permanent magnet holding member 62 in advance, the installation of the rotor 2 to the claw portions of the claw shape magnetic poles 3N and 3S can be carried out easily, as a result the working operation can be improved.

Next, referring to FIG. 6 and FIG. 7, the condition of the permanent magnet 5 which is arranged between the claw portions of the claw shape magnetic pole will be explained and also referring to FIG. 6 and FIG. 8 the construction of the permanent magnet fly-out prevention member which is arranged at the outer periphery of the claw shape magnetic pole will be explained.

Figure 6:
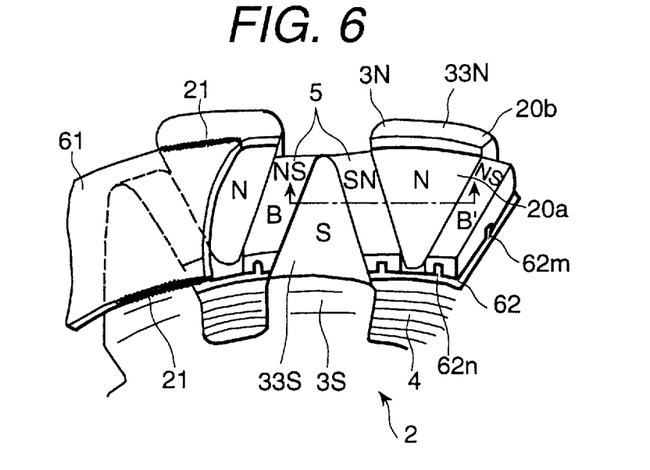
FIG. 6 is an oblique view showing an installation condition of a permanent magnet holding member used in an AC generator for use in a vehicle of the first embodiment according to the present invention.
Figure 7:
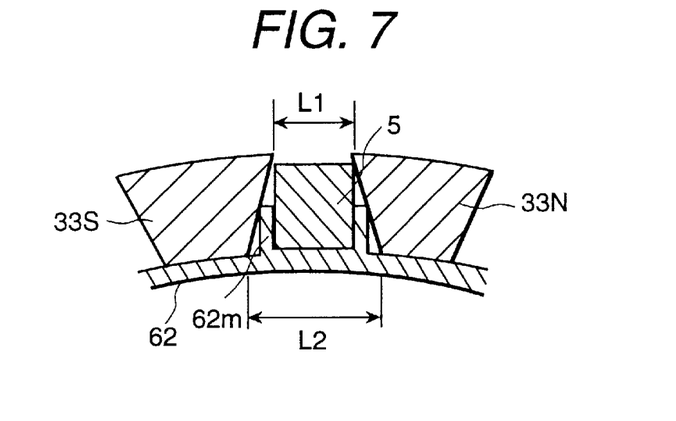
FIG. 7 is an enlarged cross-sectional view taken along to a line B-B' of FIG. 6.
Figure 8:
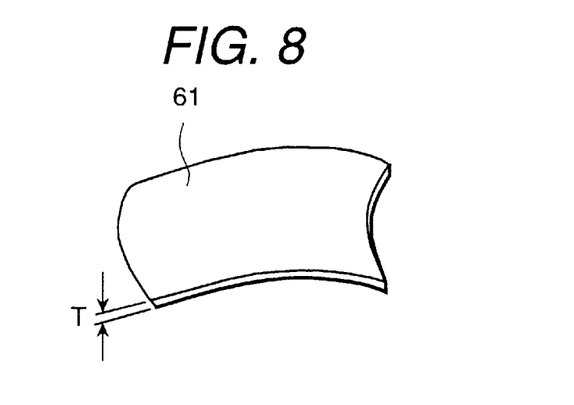
FIG. 8 is an oblique view showing a construction of a permanent magnet holding member used in an AC generator for use in a vehicle of the first embodiment according to the present invention.

FIG. 6 is an oblique view showing an installation condition of a permanent magnet holding member used in an AC generator for use in a vehicle of the first embodiment according to the present invention, FIG. 7 is an enlarged cross-sectional view taken along to a line B-B' of FIG. 6, and FIG. 8 is an oblique view showing a construction of a permanent magnet holding member used in an AC generator for use in a vehicle of the first embodiment according to the present invention.

As shown in FIG. 6, to the tip end portions of a pair of oppositely arranged claw shape magnetic poles 3N and 3S, plural claw portions 33N and 33S (name generally both as the claw portion 33) are formed. The claw portion 33 of the claw shape magnetic pole 3, as shown in figure, at an outer periphery side end portion to an axial direction, there is a construction in which a step stage having one low step stage portion 20a and one high step stage portion 20b is formed.

In the claw portion 33N of the claw shape magnetic pole 3N and the claw portion 33S of the claw shape magnetic pole 3S, the auxiliary excitation use permanent magnet 5 is arranged to contact the same pole against to the pole property which is formed by the claw shape magnetic poles 3N and 3S. The permanent magnet 5 is a solid state magnet such as a sintering magnet and a bond magnet and is fixed through the permanent magnet holding member 62.

Herein, as shown in FIG. 7, a cross-section shape of the respective claw portions 33N and 33S of the claw shape magnetic poles 3N and 3S has a trapezoid shape in which at the outer periphery side a width is made wide and at the inner periphery side a width is made narrow. In this first embodiment according to the present invention, a distance L1 of the outer periphery side of the claw portions 33N and 33S of the adjacent claw shape magnetic poles 3N and 3S is 8 mm, and in this first embodiment according to the present invention, a distance L2 of the inner periphery side is 10 mm. Further, the permanent magnet holding member 62 is used to have a thickness of 0.1 mm.

Since the permanent magnet holding member 62 holds the permanent magnet 5 from the inner periphery side of the rotor 2, the claw portion 62m is arranged in a gap between the claw portions of the claw shape magnetic poles 33N and 33S and the permanent magnet 5. Accordingly, since as a size of the permanent magnet 5, a large size magnet having a substantially same length to the distance L1 of the outer periphery side of the claw portions 33N and 33S of the adjacent claw shape magnetic poles 3N and 3S can employ, the increase magnetization operation of the magnetic flux according to the provision of the permanent magnet 5 can be made large, as a result the electric power generation efficiency can be improved.

Further, as shown in FIG. 6, at an outer face side of the permanent magnet 5 and an outer periphery face of the claw portion 33 of the claw shape magnetic pole, a fly-out prevention member 61 which is comprised of a cylindrical shape non-magnetic material body for preventing the fly-out of the permanent magnet 5 is arranged. The above stated fly-out prevention member 61 is made as one body type cylindrical shape member and by means of the shrinkage fitting manner, the press fitting manner etc. to the claw shape magnetic pole 3 can be installed easily, as a result the rotor 2 can be manufactured easily. Further, a raise-up of the claw shape magnetic pole 3 which generates during the high speed rotation can be prevented.

Further, as shown in FIG. 6, the fly-out prevention member 61 has a thickness which is similarly to the size thickness of the step stage difference (the step stage difference between the high step stage portion 20b and the low step stage portion 20a) of the claw portion 33 and to the low step stage portion 20a of the claw portion 33 the outer face of the fly-out prevention member 61 and the outer periphery face of the high step stage portion 20b of the claw portion 33 are installed to have substantially at the same face. An end portion of the fly-out prevention member 61 and the high step stage portion 20b of the claw portion 33 are welded and fixed by a welding part 21 between them.

Further, since the fly-out prevention member 61 is arranged at the low step stage portion 20a of the claw portion 33 by forming the step stage difference to the claw portion 33, the fly-out prevention member 61 and the claw shape magnetic pole 3 are fixed strongly, as a result the mechanical strength in the rotor 2 can be increased.

Further, since the outer face of the fly-out prevention member 61 and the high step stage portion 20b of the claw portion 33 are substantially the same face, the unevenness of the outer periphery face of the rotor 2 can be removed, as a result the wind loss which generates during the rotation of the rotor 2 can be reduced.

Further, as shown in FIG. 8, the thickness T of the non-magnetic material body fly-out prevention member 61 uses a non-magnetic material body cover having a gap length of less than of ½ not to increase the gap length. In this first embodiment according to the present invention, the gap length between the rotor 2 and the stator 7 is 0.35 mm, material of the used non-magnetic material body fly-out prevention member 61 to be used is a stainless steel and the thickness thereof is 0.1 mm, accordingly a magnetic gap length is 0.45 mm. In this thickness of the fly-out prevention member 61, the affect for giving the influence to the electric power generation current is very small, accordingly there is no problem. However, when the thickness of the fly-out prevention member 61 is more than ½ of the gap length, the lowering in characteristics it is unavoidable.

Further, it is desirable to set the length to the axial direction of the fly-out prevention member 61 longer than a little the length to a front direction of the permanent magnet 5 to be used. Namely, as shown in FIG. 1, the width of the stator iron core 8 of the stator 7 is substantially equal to the length to the axial direction of the permanent magnet 5 which is arranged in the rotor 2. As a result, since the length in the axial direction of the fly-out prevention member 61 is made longer than the length in the front direction of the permanent magnet 5 to be used, the leakage magnetic flux can be lessened.

As stated in above, in the vehicle use AC generator of this first embodiment according to the present invention, using the permanent magnet holding member the permanent magnet 5 is held from the inner side, further the fly-out prevention member 61 is arranged at the outer periphery side of the claw portion 33 of the claw shape magnetic pole 3 and the permanent magnet 5. Accordingly, after the permanent magnet 5 has held through the fly-out prevention member 61, since the permanent magnet 5 is installed to the rotor, the working operation of the installation of the permanent magnet 5 can be improved.

Further, since the permanent magnet holding member 62 holds the permanent magnet 5 from the inner periphery side, and the fly-out prevention member 61 is arranged at the outer periphery side, and further since the permanent magnet 5 arranged between the claw portions 33 of the claw shape magnetic pole 3 can be made large, accordingly the electric power generation efficiency can be improved.

Further, to the claw portion 33 of the claw shape magnetic pole 3 the step stage difference is provided, and since the fly-out prevention member 61 having the substantially same thickness to the step stage difference is arranged at the step stage difference, the wind loss during the rotation of the rotor 2 can be reduced.

Next, referring to FIG. 9, a vehicle use AC generator of a second embodiment according to the present invention will be explained.

Figure 9:
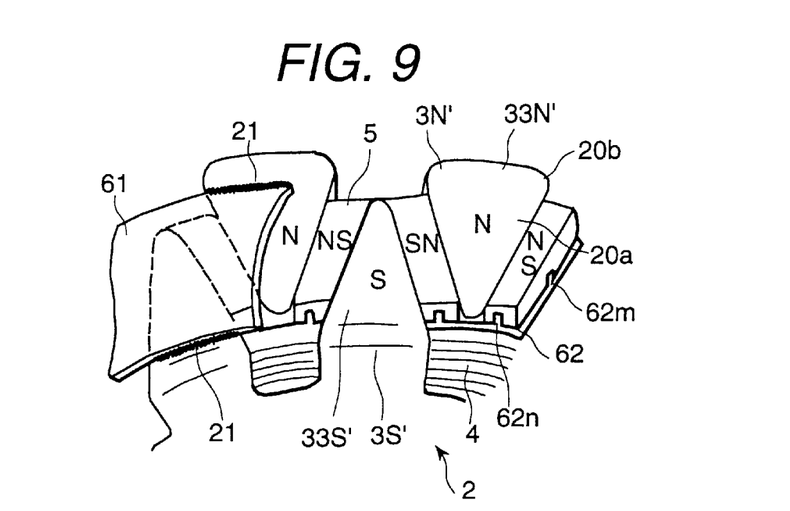
FIG. 9 is an oblique view showing an essential portion of an AC generator for use in a vehicle of a second embodiment according to the present invention.

FIG. 9 is an oblique view showing an essential part of the vehicle use AC generator of the second embodiment according to the present invention. A whole construction of the vehicle use AC generator of the second embodiment according to the present invention is similar to that of shown in FIG. 1, and a holding condition of the permanent magnet by the permanent magnet holding member is similar to those of shown from FIG. 2 to FIG. 5.

In the vehicle use AC generator of the second embodiment according to the present invention, claw portions 33N' and 33S' of claw shape magnetic poles 3N' and 3S' differ from the embodiment shown in FIG. 6, however there is not provided the step stage difference (the step stage difference between the high step stage portion and the low step stage portion) shown in FIG. 6. Accordingly, the fly-out prevention member 61 comprised of a non-magnetic material body thin plate is arranged directly at an outer periphery portion of the claw portions 33N' and 33S' of the claw shape magnetic poles 3N' and 3S'. The fly-out prevention member 61 is fixed to the claw portions 33N' and 33S' at the welding part 21.

As stated in above, in the vehicle use AC generator of this second embodiment according to the present invention, using the permanent magnet holding member 62 since the permanent magnet 5 is held from the inner side, and further the fly-out prevention member 61 is arranged at the outer periphery side of the claw portions 33N' and 33S' of the claw shape magnetic poles 3N' and 3S' and the permanent magnet 5. Accordingly, after the permanent magnet 5 has held by the fly-out prevention member 61, since the permanent magnet 5 is installed to the rotor 2, the working operation of the installation of the permanent magnet 5 can be improved.

Further, since the permanent magnet holding member 62 holds the permanent magnet 5 from the inner periphery side, and the fly-out prevention member 61 is arranged at the outer periphery side, and further since the permanent magnet arranged between the claw portions 33N' and 33S' of the claw shape magnetic poles 3N' and 3S' can be made large, accordingly the electric power generation efficiency can be improved.

Next, referring to FIG. 10 and FIG. 11, a vehicle use AC generator of a third embodiment according to the present invention will be explained.

Figure 10:
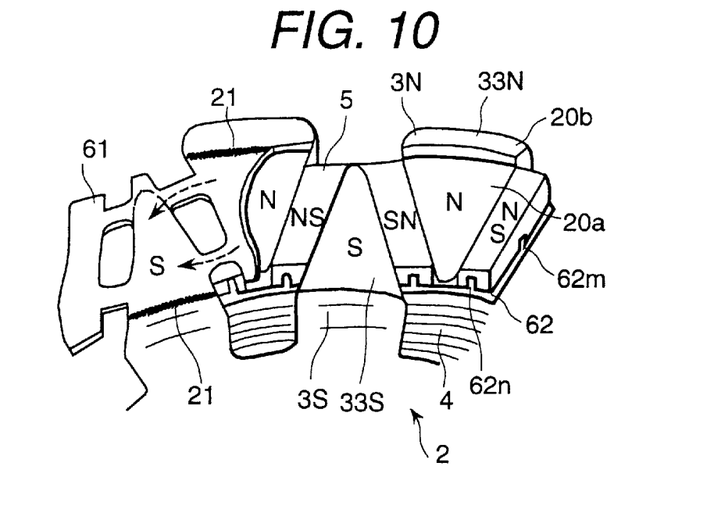
FIG. 10 is an oblique view showing an essential portion of an AC generator for use in a vehicle of a third embodiment according to the present invention.
Figure 11:
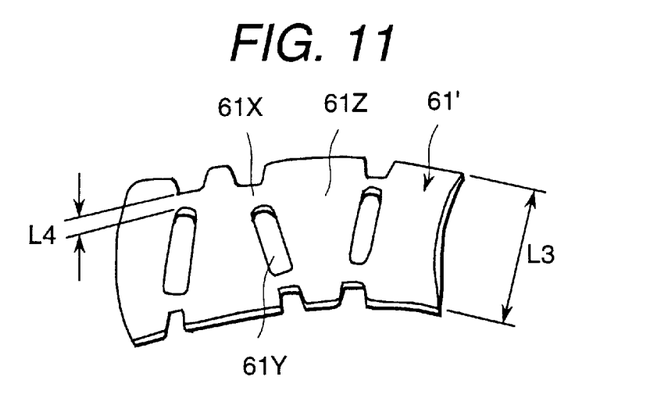
FIG. 11 is an oblique view showing a fly-out prevention member shown in FIG. 10.

FIG. 10 is an oblique view showing an essential part of the vehicle use AC generator of the third embodiment according to the present invention, and FIG. 11 is an oblique view showing a fly-out prevention member shown in FIG. 10.

A whole construction of the vehicle use AC generator of the third embodiment according to the present invention is similar to that of shown in FIG. 1, and a holding condition of the permanent magnet by the permanent magnet holding member is similar to those of shown from FIG. 2 to FIG. 5.

In the vehicle use AC generator of this third embodiment according to the present invention, as the material of the fly-out prevention member 61' a non-magnetic material body is used. In the fly-out prevention member 61', a width L3 of a portion 61Z which overlaps to the claw shape magnetic poles 33N and 33S is longer than a little the length of the permanent magnet 5 to be used and has a similar shape to the claw shape magnetic poles 33N and 33S. Further, a portion which does not overlap to the claw shape magnetic poles 33N and 33S, namely the portion which is arranged between the claw shape magnetic poles 33N and 33S, a hole portion 61Y is provided at a central portion, and between the non-overlapped portion and the overlapped portion are connected with a connection portion 61X. The reduction of the leakage magnetic flux is improved by making narrow a width L4 of the magnetic material body of the connection portion 61X.

According to the employment of the magnetic material body as the material of the fly-out prevention member 61', the magnetic gap between the rotor 2 and the stator 7 is coincided to the mechanical gap, as a result the increase in the magnetic resistance between the rotor 2 and the stator 7 can be prevented. Further, viewing from the stator side, since almost of an outer surface of the rotor is the magnetic material body, the magnetic flux pulsation between a gap which generates when the magnetic flux directs to the rotor side from the stator side can be reduced and further the magnetic vibration can be reduced, as a result the noises can be reduced.

Further, as explained in FIG. 6, a the surfaces of the claw portions 33N and 33S of the claw shape magnetic poles 3N and 3S, since the high step stage portion 20b and the low step stage portion 20a are provided, then a good adhesion performance between the claw shape magnetic poles 3N and 3S and the fly-out prevention member 61' can be attained. As stated in above, when the fly-out prevention member 61' is made of the magnetic material body, in the portion which is positioned between the claw shape magnetic poles 3N and 3S (the outer surface portion of the permanent magnet 5) by forming narrow the width L4 of the magnetic material body, accordingly the leakage magnetic flux can be reduced. Further, the fly-out prevention member 61' and the claw shape magnetic poles 3N and 3S are welded and fixed in the welding part 21.

Figure 12:
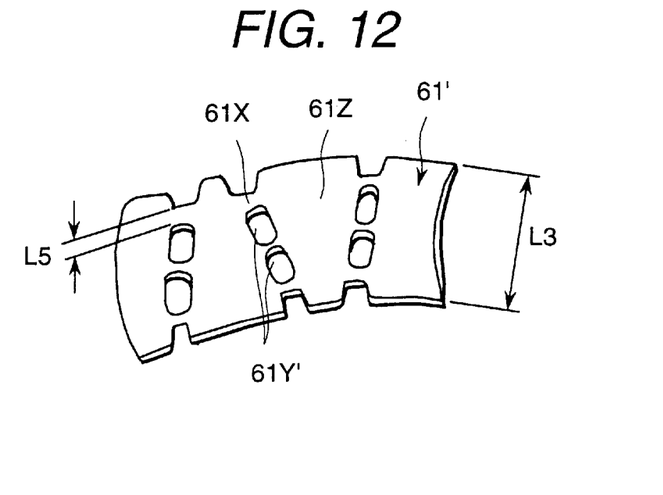
FIG. 12 is an oblique view showing another fly-out prevention member of a fourth embodiment according to the present invention.

Further, in the example shown in FIG. 11, in a case where the hole portion 61Y which is arranged at the central portion is one, however it can provide plural hole portions 61Y' of a fourth embodiment according to the present invention, as shown in FIG. 12.

In the fly-out prevention member 61 or 61' explained in above, a beforehand cylindrical shape member is the shrinkage fitting manner to the claw shape magnetic pole 3 surface of the rotor, and after that the claw shape magnetic pole 3 and the fly-out prevention member 61 are fixed with the welding manner. Further, since the permanent magnet 5 arranged between the claw shape magnetic poles 3 is temporally fixed to the permanent magnet holding member 62, the permanent magnet 5, the permanent magnet holding member 62 and the claw shape magnetic pole 3 are adhered using a vanish material and are formed as one body.

Namely, in the vehicle use AC generator of this third embodiment according to the present invention, in the fly-out prevention member 61', since the outer face of the fly-out prevention member 61' at the low step stage portion 20a of the claw portion 33 and the outer periphery face of the high step stage portion 20b of the claw portion 33 are arranged to have substantially same face, the magnetic gap between the rotor 2 and the stator 7 is coincided to the mechanical gap, as a result the magnetic resistance between the rotor 2 and the stator 7 does not increase.

In this time, since the fly-out prevention member 61' is constituted by the magnetic material body thin plate, a part of the magnetic flux of the permanent magnet 5, as shown in a dot curve line in FIG. 10, passes through the fly-out prevention member 61' and shorts, accordingly the narrow width portion of the fly-out prevention member 61' is immediately magnetically saturated. Further, the magnetic flux amount which leaks to the fly-out prevention member 61' can be dispensed with a small amount within all magnetic flux of the permanent magnet 5, as a result the effect for providing the permanent magnet 5 in which the magnetic flux formed by the field winding 4 can be not damaged.

Incidentally, when the vehicle use AC generator of this third embodiment is compared with the conventional AC generator in which the holding member of the magnetic material body is arranged in the outer face of the permanent magnet 5 between the claw portions of the claw shape type magnetic pole, in comparison with the conventional vehicle use AC generator, the electric power generation current having 5 A (5 ampere) degree can be improved.

Further, viewing from the side of the stator 7, almost outer peripheral face of the rotor 2 becomes the magnetic material body, the magnetic resistance between the rotor 2 and the stator 7 is substantially constant, the magnetic pulsation between the rotor 2 and the stator which generates when the magnetic flux of the magnetic circuit directs for from the stator 7 to the rotor 2 can be reduced, and the magnetic vibration can be reduced, as a result the noises can be reduced.

With the vehicle use AC generator constituted in above of the various embodiments according to the present invention, since the fly-out prevention member is made of the magnetic material body material and further since the interval of the adjacent claw shape magnetic poles is made narrow, the electric power generation current can be increased and the electric power generation efficiency can be improved.

Further, since the magnetic vibration between the rotor 2 and the stator 7 is reduced, as a result the noises can be reduced.

Further, since the welding part between the fly-out prevention member and the claw shape magnetic pole 3 does not corrode, as a result the durability in the rotor 2 can be improved.

Further, since the fly-out prevention member is formed with the ring shape, the rotor can be manufactured easily, and the raise-up of the claw shape magnetic pole which generates during the high rotation can be prevented.

Further, at the low step stage of the claw portion of the fly-out prevention member, since the outer face of the fly-out prevention member and the outer peripheral face of the high step stage portion of the claw portion are arranged to have the substantially same face, the fly-out prevention member and the claw shape magnetic pole can be fixed strongly and also the wind loss in the rotor can be reduced.

According to the present invention, the permanent magnet which is arranged between the claw portions of the claw shape magnetic pole is held in advance from the inner peripheral side through the permanent magnet holding member and the integrally formed magnet module is assembled between the claw portion of the claw shape magnetic pole, the working operation during the assembly of the rotor can be improved.

Further, in the construction of the fly-out prevention member for preventing the fly out the permanent magnet which is arranged between the claw portions of the claw shape magnetic pole, since the fly-out prevention member is arranged to the outer face side of the permanent magnet and between the claw portions of the claw shape magnetic pole and further the fly-out prevention member is made of the non-magnetic material body material or the magnetic material body material, as a result the permanent magnet can be formed large and then the electric power generation current can be made large and further the electric power generation efficiency can be improved.

Figure 13A:
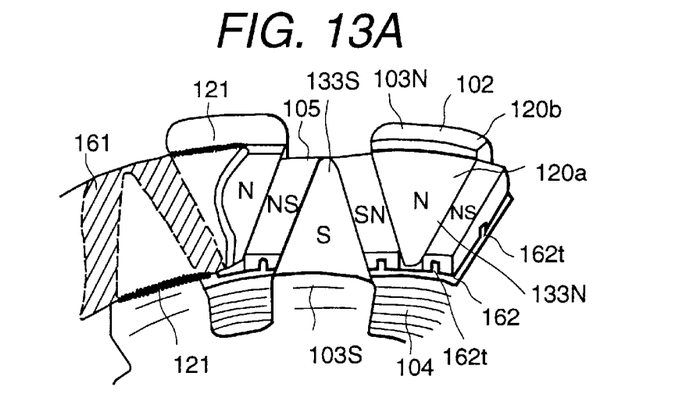
FIG. 13A is an oblique view showing a fifth embodiment of a vehicle use AC generator according to the present invention.
Figure 13B:
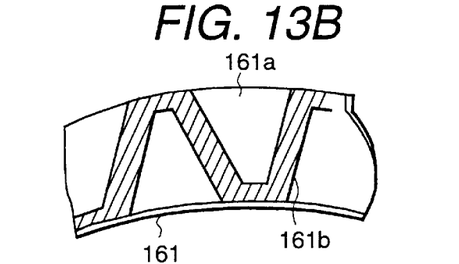
FIG. 13B is a partial cross-sectional view showing the fifth embodiment of the vehicle use AC generator according to the present invention.

Next, the fly-out prevention of a fifth embodiment according to the present invention will be explained. In FIG. 13A and FIG. 13B explain a claw shape magnetic pole 103 of a rotor 102 and as the material for the fly-out prevention member 161, a metal cover having the characteristic of the magnetic material body and the non-magnetic material body is used. In concretely, a case where 13Cr—Fe alloy (C-0.69, Si-0.3, Mn-0.7, P-0.021, S-0.002, Cr-13.1) manufactured by Hitachi Metal Company is used will be explained.

As a composite magnet body material such a 13Cr stainless steel, for example the above stated 13Cr—Fe, there are a martensite system stainless steel and also a ferrite system stainless steel. The martensite system stainless steel is SUS 420J2 or SUS 403 in which 13Cr system stainless steel is used. In Cr system steel, a range of Cr to be used is about 12–15. 13Cr system stainless steel is constituted of elements of C 0.5–0.6 wt. %, Si less than 0.35 wt. %, Mn 0.6–0.8 wt. %, P less than 0.03 wt. %, S less than 0.02 wt. %, Cr 12.5–13.5 and residue of Fe.

The claw shape magnetic pole 103, as shown in FIG. 13A, comprises a pair of oppositely arranged claw shape magnetic poles 103N' and 103S', at tip portions plural claw portions 133N and 133S (both are claw portions 133 in a general term) are formed. The claw portions 133 of the claw shape magnetic pole 103, as shown in figure, against the axial direction at the outer peripheral side end portion, a step stage having one low step stage portion 120a and a high step stage portion 120b can be provided.

To the claw portion 133N of the claw shape magnetic pole 103N and the claw portion 133S of the claw shape magnetic pole 103S, as shown in FIG. 13A, a permanent magnet 105 for an auxiliary excitation use is arranged to contact the same pole against the polarity which is formed by the claw shape magnetic poles 103N and 103S. The permanent magnet 105 is a solid magnet such as a sintering magnet and a bond magnet and by the permanent magnet holding member 162 stated in above, a permanent magnet 105 is made integrally.

An outer face of the permanent magnet 105 and an outer peripheral face of the claw portion 133 of the claw shape magnetic pole 103, as shown in FIG. 13B, a cylindrical shape fly-out prevention member 161 which prevents the fly-out of the permanent magnet 105 is arranged. Thus since the fly-out prevention member 161 is made with an integral shape type cylindrical shape and it can install easily to the claw shape magnetic pole 103 by means of a shrinkage fitting manner and a press fitting manner etc, accordingly the rotor 102 can be manufactured easily. Further, there has a function in which the raise-up which occurs during the high speed rotation of the claw shape magnetic pole 103 can be prevented.

Further, the fly-out prevention member 161, as shown in FIG. 13A and FIG. 13B, has a thickness substantially similar to the same size of the step stage difference of the claw portion 133 and further to the low step stage portion 120a of the claw portion 133 the outer face of the fly-out prevention 161 and the outer peripheral face of the high step stage portion 120b of the claw portion 133 are installed to form the substantially same face, and they are fixed at a welding part 121, which are formed between an end portion of the fly-out prevention member 161 and the high step stage portion 120b of the claw portion 133, by the welding manner.

Further, since forming the step stage to the claw portion 133 and the fly-out prevention member 161 is arranged at the low step stage portion 120a of the claw portion 133, the fly-out prevention member 161 and the claw shape magnetic pole 133 are fixed strongly, accordingly the mechanical strength in the rotor 102 can be heightened. Further, the outer face of the fly-out prevention member 161 and the outer peripheral face of the high step stage portion 120b of the claw portion 133 are formed substantially the same face, the unevenness is removed from the outer peripheral face of the rotor 102, accordingly the wind loss which occurs during the rotation of the rotor 102 can be reduced.

According to the vehicle use AC generator of this fifth embodiment according to the present invention, not to increase the magnetic gap length, to form the magnetic material body at the portion arranged to the surface of the claw shape magnetic pole and to form the non-magnetic material body at the portion arranged between the claw shape magnetic poles, since the fly-out prevention member is arranged, the leakage magnetic flux between the claw shape magnetic poles can be reduced.

In the vehicle use generator of this fifth embodiment according to the present invention, the gap length between the rotor and the stator is 0.35 mm and a thickness of the used 13Cr—Fe alloy is 0.5 mm. Accordingly, in this fifth embodiment according to the present invention shown in FIG. 13A and FIG. 13B, the low step stage portion 120a is lower than 0.5 mm compared with the high step stage portion 120b. Further, it is desirable to set the length at the axial direction of the fly-out prevention member 161 longer a little than the length at the axial direction of the permanent magnet to be used.

Next, the preparation method of the magnetic material body part and the non-magnetic material body part will be explained. 13Cr—Fe alloy manufactured by Hitachi Metal Company stated in former is one by adding the heat to the properties of the magnetic material body shows the properties of the non-magnetic material body. In this time, as the heat to be added, it can add one minute under the temperature of the metal of 1200–1300° C. or by melting the metal face under 1500° C. at a short time, then the magnetic material body part can be changed to the non-magnetic material body.

In concretely, in the alloy having the properties of the magnetic material body comprised of 13Cr—Fe, to only a location where the alloy is arranged between the claw shape magnetic poles, the temperature is locally raised about 1500° C. degree and the metal is melt by means of a welding machine using the plasma, the laser and the electron beams etc., accordingly the alloy can have the properties of the non-magnetic material body. Further, it is desirable to suit the beam diameter of the plasma, the laser and the electron beams to be used to the width of between the claw shape magnetic poles, however when the beam diameter is narrow it can carry out dividing several numbers of the beams. Further, to prevent the oxidation of the welding part, it can carry out under an inert gas atmosphere such as Ar gas etc.

The above fact is explained to the fly-out prevention member having the magnetism part and the non-magnetic material body part using 13Cr—Fe alloy, however it can similar effect in which in the fly-out prevention member 161 a magnetic material body portion 161a constituted by the magnetic material body and a non-magnetic material body portion 161b constituted by the non-magnetic material body are arranged regularly and the respective joint parts is manufactured integrally by means of a welding manner. Further, in this time, to between the claw shape magnetic poles where the leakage magnetic flux occurs easily, the non-magnetic material body part 161b is arranged, thus the leakage magnetic flux can be reduced, and further at a location where the gap length is not made large, the magnetic material body part 161a is arranged, thus the gap length is not made large accordingly the good electric power generation performance can be obtained.

Next, a sixth embodiment of a vehicle use AC generator according to the present invention will be explained referring to FIG. 14A and FIG. 14B.

Figure 14A:
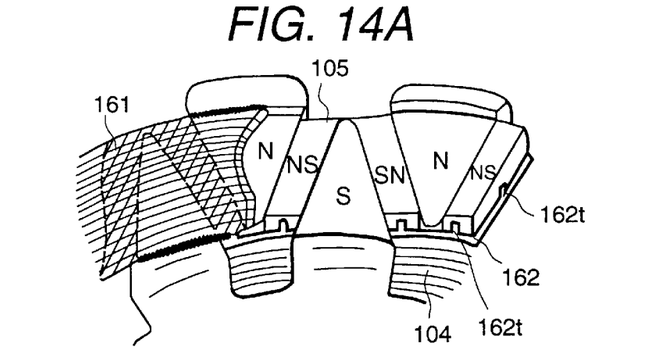
FIG. 14A is an oblique view showing a sixth embodiment of a vehicle use AC generator according to the present invention.
Figure 14B:
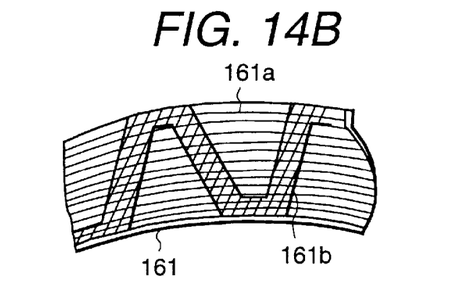
FIG. 14B is a partial cross-sectional view showing the sixth embodiment of the vehicle use AC generator according to the present invention.

FIG. 14A and FIG. 14B show the claw portion in which the above stated 13Cr—Fe alloy rings having a thickness of 0.1 mm–1.0 mm are laminated in an outer peripheral face of the rotor 102 at an axial direction and in a location which corresponds to between the claw shape magnetic poles the metal is locally melt using an Ar gas, the laser and the electron beam etc. and a non-magnetic material body part is formed.

In this time, the above stated alloy is arranged at the most outer peripheral portion of the claw shape magnetic pole by means of the shrinkage fitting manner and the press fitting manner etc. Since the effect obtained by the lamination structure is to reduce the loss due to the eddy current, for example, 13Cr—Fe alloy is formed a wire shape by preparing a long and slender and can wind to the outer peripheral face of the claw shape magnetic pole. In this case, the similar effect can be obtained by carrying out the thermal processing about the part arranged between the claw shape magnetic poles using the above stated welding machine.

Figure 15A:
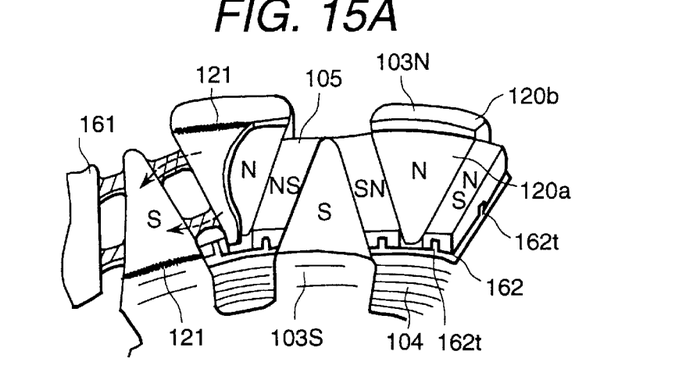
FIG. 15A is an oblique view showing a seventh embodiment of a vehicle use AC generator according to the present invention.
Figure 15B:
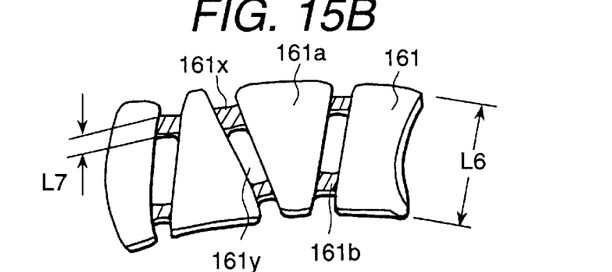
FIG. 15B is a partial cross-sectional view showing the seventh embodiment of the vehicle use AC generator according to the present invention.

Next, a seventh embodiment of a vehicle use AC generator according to the present invention will be explained referring to FIG. 15A and FIG. 15B. Same numerals shown in FIG. 15A and FIG. 15B indicate the same elements shown in FIG. 13A and FIG. 13B. The difference between FIG. 15A and FIG. 15B and FIG. 13A and FIG. 13B is a provision of a hole portion 161y which is provided at the location corresponding to between the claw shape magnetic poles of the fly-out prevention member 161. A numeral L6 is a width of an overlapping portion to the claw shape magnetic pole and a numeral L7 is a width of the magnetic material body of a connection part 161x.

Further, as shown in FIG. 15A and FIG. 15B, when the structure to which the hole portion 161y is provided is employed, only a connection part which is not the hole portion 161y is made to the non-magnetic material body part according the thermal processing. Further, in these embodiments the similar effect stated in above can be obtained.

Figure 16A:
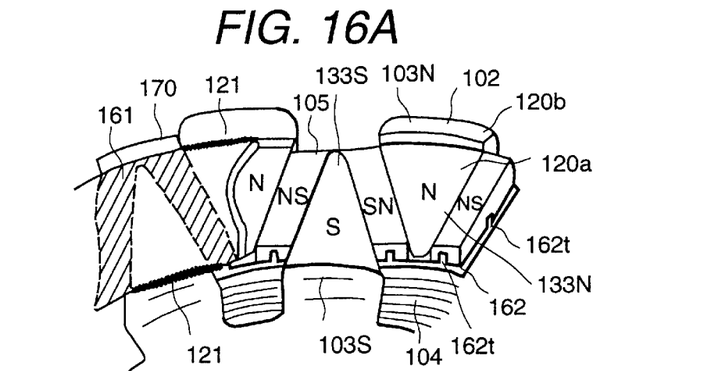
FIG. 16A is an oblique view showing an eighth embodiment of a vehicle use AC generator according to the present invention.
Figure 16B:
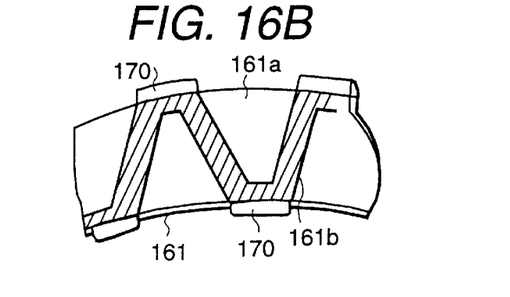
FIG. 16B is a partial cross-sectional view showing the eighth embodiment of the vehicle use AC generator according to the present invention.

Next, an eighth embodiment of a vehicle use AC generator according to the present invention will be explained referring to FIG. 16A and FIG. 16B. Same numerals shown in FIG. 16A and FIG. 16B indicate the same elements shown in FIG. 15A and FIG. 15B. The difference between FIG. 16A and FIG. 16B and FIG. 15A and FIG. 15B is a provision of at least one claw portion 170 which is provided to the fly-out prevention member. The claw portion 170 forms a part of the fly-out prevention member. The above stated claw portion 170 works both the assembly operation of the claw portion and as the detent mechanism of the claw portion. The provision of the claw portion 170, the positioning alignment can be obtained between the claw shape magnetic poles of the rotor.

In the fifth, the sixth, the seventh and the eighth embodiments according to the present invention, forming the step stage difference at the claw portion of the claw shape magnetic pole and the fly-out prevention member 161 is installed to the outer peripheral face of the claw portion of the claw shape magnetic pole, however in a case where the step stage difference is not provided the obtained effect is substantially the same effect.

According to the present invention, in the vehicle use AC generator having the fly-out prevention member for preventing the fly-out of the permanent magnets which are arranged between the claw portions of the claw shape magnetic pole, since the fly-out prevention member is arranged the outer face side of the permanent magnet and between the claw portions of the claw shape magnetic pole and since the material of the fly-out prevention member is the composite body with which the non-magnetic material body and the magnetism body are mixed, as a result the electric power generation current can be made large and the electric power generation efficiency can be improved.

Further, since the permanent magnet which is arranged between the claw portions of the claw shape magnetic pole is assembled in advance as the integrated magnet module between the claw portions of the claw shape magnetic pole by the permanent magnet holding member and the permanent magnet which is arranged between the claw portions of the claw shape magnetic pole is made as the solid magnet, as a result the electric power generation current can be made large and the eclectic power generation efficiency can be improved.

What is claimed is:

1. In an alternating current generator for use in a vehicle, comprising:
   an oppositely arranged pair of claw shape magnetic poles, each having plural claw portions;
   plural permanent magnets arranged between said claw portions of said oppositely arranged claw shape magnetic poles;
   a rotor having a permanent magnet fly-out prevention member for preventing fly-out of said permanent magnet; and
   a stator arranged by setting apart with a predetermined interval to said rotor;
   the vehicle use alternating current generator further comprises wherein,
      a permanent magnet holding member for holding said plural permanent magnets from an inner periphery side, and
      said permanent magnet fly-out prevention member is arranged at outer periphery sides of said claw portion of said claw shape magnetic pole and said permanent magnet so as to overlay an outer periphery of said claw shape magnetic pole as well as said permanent magnet.

2. An alternating current generator for use in a vehicle according to claim 1, wherein
   said permanent magnet fly-out prevention member is constituted by a non-magnetic material body.

3. An alternating current generator for use in a vehicle according to claim 2, wherein
   a thickness of said permanent magnet fly-out prevention member is less than ½ of a gap length formed between said rotor and said stator.

4. An alternating current generator for use in a vehicle in an alternating current generator for use in a vehicle comprising:
   an oppositely arranged pair of claw shape magnetic poles, each having plural claw portions;
   plural permanent magnets arranged between said claw portions of said oppositely arranged claw shape magnetic poles;
   a rotor having a permanent magnet fly-out prevention member for preventing fly-out of said permanent magnet; and
   a stator arranged by setting apart with a predetermined interval to said rotor;
   the vehicle use alternating current generator further comprises wherein,
      a permanent magnet holding member for holding said plural permanent magnets from an inner periphery side, and
      said permanent magnet fly-out prevention member is arranged at outer periphery sides of said claw portion of said claw shape magnetic pole and said permanent magnet wherein
         said permanent magnet fly-out prevention member is constituted by a magnetic material body and has a hole portion which positions at said outer periphery side of said permanent magnet.

5. An alternating current generator for use in a vehicle, in an alternating current generator for use in a vehicle comprising:
   an oppositely arranged pair of claw shape magnetic poles, each having plural claw portions;
   plural permanent magnets arranged between said claw portions of said oppositely arranged claw shape magnetic poles;
   a rotor having a permanent magnet fly-out prevention member for preventing fly-out of said permanent magnet; and
   a stator arranged by setting apart with a predetermined interval to said rotor;
   the vehicle use alternating current generator further comprises wherein,
      a permanent magnet holding member for holding said plural permanent magnets from an inner periphery side, and
      said permanent magnet fly-out prevention member is arranged at outer periphery sides of said claw portion of said claw shape magnetic pole and said permanent magnet wherein
         said permanent magnet fly-out prevention member is arranged at a low step stage portion of a step stage difference portion which is formed in said claw portion of said claw shape magnetic pole, and a thickness of said permanent magnet fly-out prevention member is equal to a step stage difference of said step stage difference portion.

6. In an alternating current generator for use in a vehicle comprising:

a pair of oppositely arranged claw shape magnetic poles in which plural claw portions are formed at a tip end portion;

field winding for magnetizing said claw shape magnetic pole;

permanent magnets arranged between said claw portions of said claw shape magnetic poles and for magnetically increasing the magnetic flux which is formed by said field winding and further integrally formed as one body by a permanent magnet holding member;

a stator arranged by setting apart a predetermined interval to a rotor and having a stator winding which generates the alternating current voltage by the magnetism of said claw shape magnetic pole; and a metal form fly-out prevention member for preventing a scattering of said permanent magnet arranged at the most outer peripheral portion of said claw shape magnetic pole;

the vehicle use alternating current generator, wherein in said metal form fly-out prevention member, a magnetic material body portion and a non-magnetic material body portion are mixed with.

7. An alternating current generator for use in a vehicle according to claim 6, wherein said magnetic material body portion of said fly-out prevention member has a substantially same type to a shape of said claw shape magnetic pole and is arranged as an overlapped position with said claw shape magnetic pole and other portion except for said above portion is constituted by said non-magnetic portion.

8. An alternating current generator for use in a vehicle according to claim 6, wherein said magnetic material body portion and said non-magnetic portion of said fly-out prevention member are a ring which is integrally manufactured by connecting an independent magnetic material body metal and an independent non-magnetic material body metal using a welding manner.

9. An alternating current generator for use in a vehicle according to claim 6, wherein said magnetic material body portion and said non-magnetic portion of said fly-out prevention member are prepared using a manner in which to a magnetic material body comprised of a composite magnetic material body by raising locally the temperature and said magnetic material body portion is made to said non-magnetic material body portion.

10. An alternating current generator for use in a vehicle according to claim 6, wherein said fly-out prevention member is constituted by laminating plural number of a composite magnetic material body in an axial direction; and a portion corresponding to between said claw shape magnetic poles is non-magnetic material body carried out by thermal processing.

11. An alternating current generator for use in a vehicle according to claim 6, wherein said fly-out prevention member is constituted by winding a wire of a composite magnetic material body at a ring shape at the most peripheral face of said claw shape magnetic pole; and a portion corresponding to between said claw shape magnetic poles is non-magnetic material body carried out according to the thermal processing.

12. An alternating current generator for use in a vehicle according to claim 6, wherein said fly-out prevention member is welded to said claw portion of said claw shape magnetic pole; and said permanent magnet holding member, said permanent magnet and said claw shape magnetic pole are fixed integrally with a varnish.

13. An alternating current generator for use in a vehicle according to claim 6, wherein to said fly-out prevention member at least one claw portion for positioning aligning between said claw shape magnetic pole of said rotor.

* * * * *